United States Patent [19]

Kanno et al.

[11] Patent Number: 5,070,840

[45] Date of Patent: Dec. 10, 1991

[54] IGNITION SYSTEM FOR MARINE PROPULSION UNIT

[75] Inventors: Isao Kanno; Kazunobu Nozue, both of Hamamatsu, Japan

[73] Assignee: Sanshin Kogyo Kabushiki Kaisha, Hamamatsu, Japan

[21] Appl. No.: 573,851

[22] Filed: Aug. 28, 1990

[30] Foreign Application Priority Data

Aug. 28, 1989 [JP] Japan ................... 1-221334

[51] Int. Cl.5 ............................ F02P 5/06; F02P 5/15
[52] U.S. Cl. .................................................... 123/418
[58] Field of Search ................. 123/415, 416, 417, 418

[56] References Cited

U.S. PATENT DOCUMENTS

| | | | |
|---|---|---|---|
| 4,380,982 | 4/1983 | Kobashi | 123/416 |
| 4,448,162 | 5/1984 | Ninomiya et al. | 123/418 |
| 4,503,822 | 3/1985 | Kobayashi et al. | 123/417 |
| 4,506,639 | 3/1985 | Murakami et al. | 123/418 |
| 4,718,014 | 1/1988 | Kobayashi et al. | 123/418 |
| 5,020,497 | 6/1991 | Umehara et al. | 123/418 |

Primary Examiner—Tony M. Argenbright
Assistant Examiner—Robert E. Mates
Attorney, Agent, or Firm—Ernest A. Beutler

[57] ABSTRACT

An electronic engine speed control particularly adapted for use in marine vehicles for maintaining engine speed in the event the load on the engine changes. The spark timing is adjusted only in the event the engine speed changes without a change in position of throttle valve of the engine. If the speed decreases under these conditions the spark is advanced and if the speed increases the spark is retarded.

7 Claims, 2 Drawing Sheets

IGNITION SYSTEM FOR MARINE PROPULSION UNIT

BACKGROUND OF THE INVENTION

This invention relates to an ignition system for a marine propulsion unit and more particularly to an improved ignition system that will prevent hunting of engine speed in response to changes in engine load.

It is well known to provide modern spark ignited internal combustion engines with electronic spark control circuits. Such electronic spark controls are operative to control the ignition timing in response to changes in throttle position and changes in engine speed. Such devices are highly effective in most applications.

However, in many applications for an internal combustion engine the load on the engine can change without any operator control input and such changing loads can, unless otherwise compensated for, change the speed of the vehicle being propelled by the engine and also, of course, the engine speed. For example, most electronic ignition controls are effective so as to retard spark timing when the engine speed is slowed and to advance spark timing when the engine speed increases. As a result, if traveling at a given speed and the load on the engine increases, the speed will decrease. This will inherently cause a reduction in the spark advance which causes a further speed reduction. On the other hand, if the speed of the vehicle increases due to a reduced load, then the spark advance will increase and the engine and vehicle speed will continue to increase. These problems are particularly acute in connection with applications in water vehicles wherein the wave pattern can cause frequent changes in load on the engine.

It is, therefore, a principal object of this invention to provide an improved spark control arrangement for an internal combustion engine wherein the engine speed will be maintained constant with changes in load.

It is a further object of this invention to provide an automatic spark advance system for an internal combustion engine which is responsive to engine speed and throttle position and which will maintain a constant speed of the engine in response to varying loads and when the throttle position is held constant.

It is a further object of this invention to provide an improved ignition system and electronic ignition control for a marine application.

SUMMARY OF THE INVENTION

This invention is adapted to be embodied in an electronic ignition control circuit for an internal combustion engine having a throttle valve and means for detecting engine speed. Means control the spark timing of the engine in response to at least one of the engine speed and throttle valve position. Means are also provided for determining a change in engine speed in response to engine load and regardless to a change in the position of the throttle valve. When this condition is sensed, means adjust the spark timing in response to the sensed condition to maintain engine speed constant.

DETAILED DESCRIPTION OF THE PREFERRED EMBODIMENT OF THE INVENTION

Figure 1:
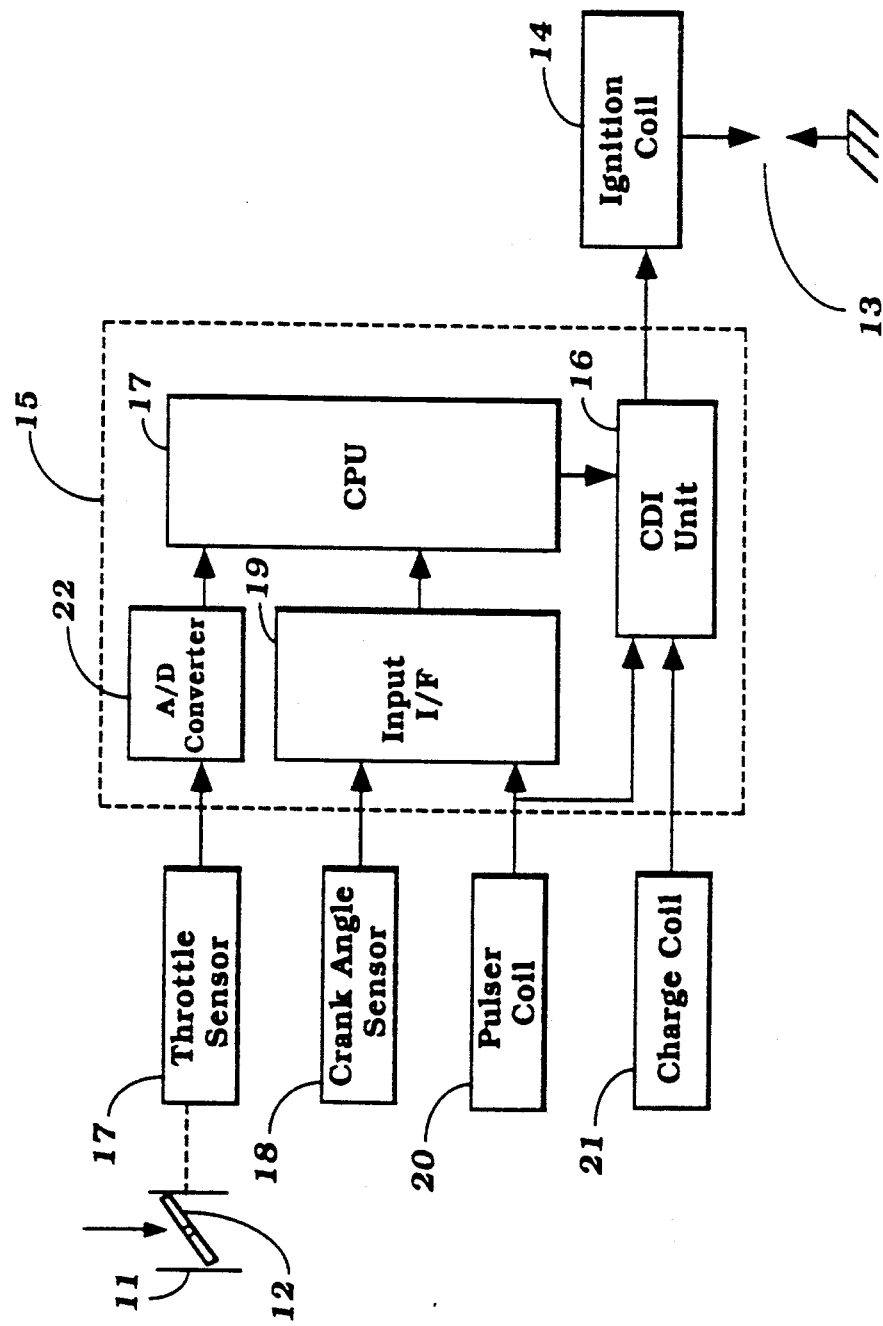
FIG. 1 is a partially schematic block diagram showing an ignition system constructed in accordance with an embodiment of the invention.

Referring first to FIG. 1, this is a schematic showing of an internal combustion engine for a marine propulsion unit and particularly the ignition control circuit therefore. The engine is not shown in its totality and it is to be understood that the engine may either be an inboard mounted engine which may drive the watercraft through a conventional propeller or through a stern drive or the powering internal combustion engine of an outboard motor. Although the invention is described in conjunction with a marine vessel, it is to be understood that the invention may have application in other uses of the internal combustion engine. The invention, however, has particular utility in connection with marine vehicles since the throttle is normally set in a fixed position in such vehicles and because the fact that the load may vary with quite large degrees of frequency in a marine application due to such factors as wave action or the like.

The engine, which is not illustrated in any detail, includes an induction system having an induction passage 11 in which a throttle valve 12 is positioned for manual speed control of the engine. The engine is also provided with an ignition system that includes, among other things, a spark plug 13 that is fired by a spark coil 14 through an ignition system control, shown in block form and indicated generally by the reference numeral 15. The ignition system 15 includes a capacitor discharge ignition system 16 that fires the spark plug 13 by energizing the primary winding of the coil 14 in a known manner. The timing of firing of the spark plug 14 is controlled, for example by switching an SCR, and this switching is accomplished by a CPU, indicated generally by the reference numeral 17. The normal spark timing of the firing of the spark plug 13 is controlled by any known type of strategy which may include a throttle position sensor 17 that senses the position of the throttle valve 12 and a crank angle sensor 18 that provides an input signal to the CPU 17 through an input block 19. In addition, the ignition circuit includes a pulser coil 20 that provides a pulse signal at a given angle of the crankshaft and which also inputs its signal to the CPU through the interface 19. The pulser coil 20 also sends a triggering signal to the CDI ignition circuit 16, as is well known in this art.

The CDI ignition circuit 16 also has a charging capacitor which is charged from a charging coil 21 in a known manner.

The throttle position sensor 17 outputs an analog signal and this is converted to a digital signal for input to the CPU 17 by an analog to digital converter 22.

Figure 2:
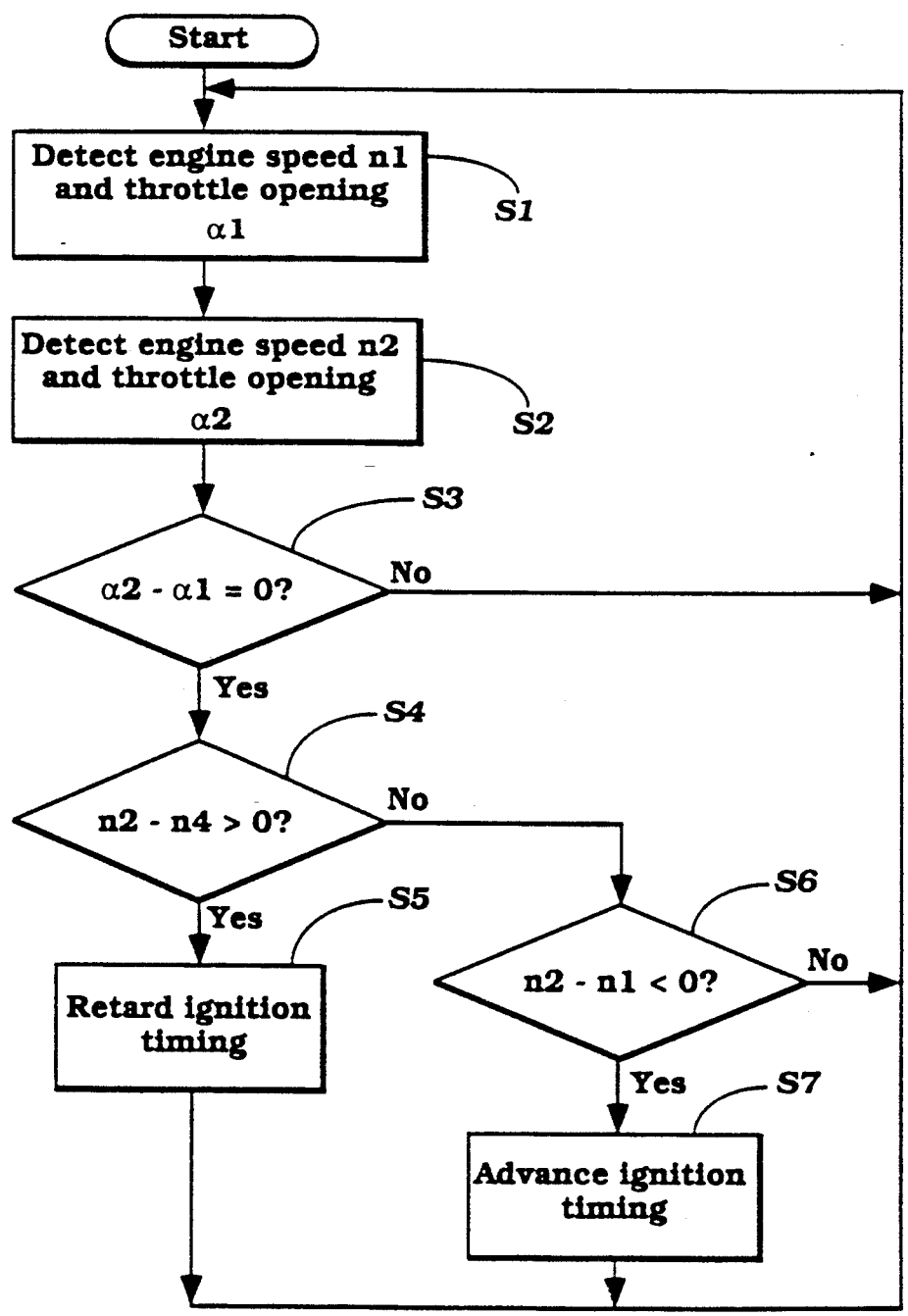
FIG. 2 is a block diagram showing the control routine for the described system.

The CPU 17 can provide a normal spark advance curve for the capacitor discharge ignition system 16 of the type which is related primarily to engine speed and which provides a fixed spark advance at certain low speeds, a progressively increasing spark advance as the engine speed increases and then a fixed spark advance from a high engine speed up to maximum engine speed. However, in accordance with the invention there is super imposed upon this a load sensing condition which will sense when the engine load tends to increase or decrease the engine speed and which precludes an automatic spark advance or spark retard which would aggravate the speed increase or decrease as aforenoted. This is achieved by a control routine programmed into the CPU 17 and which may be best understood by reference to FIG. 2.

Once the program starts it moves to the step $S_1$ so as to determine engine speed $n_1$ and throttle angle opening $\alpha 1$. The program then waits for a predetermined, relatively short time period and moves to the step $S_2$ wherein engine speed $n_2$ and throttle opening $\alpha 2$ are again measured. The program then moves to the step $S_3$ to determine if the throttle angle position is being changed. That is, at the step $S_3$ there is a comparison of $\alpha 2$ to $\alpha 1$, which may be made by subtracting the value of $\alpha 1$ from $\alpha 2$.

The reason for the step $S_3$ is to discriminate between conditions when the operator is calling for either an acceleration or deceleration of the watercraft. If the throttle is being opened the program determines that there is an acceleration being called for and if the throttle is being closed it is determined that a deceleration is being called for. Therefore, if the value of 2 minus $\alpha 1$ is substantially different from zero then the program repeats back to the step $S_1$. If, however, it is determined at the step $S_3$ that the throttle position is being held constant then the program moves to the step $S_4$ to determine if the engine speed $n_2$ was greater than the engine speed $n_1$.

If it is determined at the step $S_4$ that the engine speed has been increased then the program assumes that the load on the engine has decreased and this is the cause of the engine speed increase. The program then moves to the step $S_5$ so as to retard the engine timing. The engine timing is retarded by a predetermined number of degrees or fractional degrees and the program then moves back to the step $S_1$. If all other conditions continue to be the same and the speed is still increasing the program will continue to move through the steps $S_1$, $S_2$, $S_3$ and $S_4$ to the step $S_5$ to make a further incremental retardation of the spark timing.

At the step $S_4$ it is determined that the speed has not increased ($n_2$ is not greater than $n_1$) then the program moves to the step $S_6$ to determine if the speed has decreased by determining if the value $n_2$ is less than $n_1$ ($n_2 - n_1$). If the engine speed has not decreased then it is assumed that the speed is held constant and no spark timing adjustment is called for due to a load change. The program then repeats back to the step $S_1$.

If, however, it is determined at the step $S_6$ that the engine speed has decreased then the program moves to the step $S_7$ wherein a spark advance is achieved because it is assumed that the engine speed has decreased due to a load increase on the engine speed. Once the step $S_7$ has been completed, the program again repeats back through the prementioned sequence. That is, if the advanced engine timing causes an increase in engine speed above the previous speed than at the step $S_4$ this determination is made and the program moves to the step $S_5$ so as to retard the ignition timing. If, however, the speed continues to decrease then the program moves from the step $S_4$ to the step $S_6$ and onto the step $S_7$ to provide a further additional incremental advance in timing so as to compensate for the load.

It should be readily apparent from the foregoing description that the described circuit and ignition control is extremely effective in maintaining constant engine speed without operating the throttle valve and under conditions when the throttle valve is held constant but the engine speed is changing due to loads. As has been noted, this has particular advantage in marine applications but can be utilized in other applications. Of course, the described embodiment and routine of operation is a preferred form of the invention and various changes and modifications may be made without departing from the spirit and scope of the invention, as defined by the appended claims.

We claim:

1. An electronic ignition control circuit for an internal combustion engine having a throttle valve, means for determining engine speed, means for setting a called for spark timing in response to at least one of engine speed and throttle valve position, means for determining a change in engine speed in response to engine load when the position of said throttle valve is held constant, and means for adjusting spark timing in response to such a sensed condition to maintain engine speed constant.

2. An electronic ignition as set forth in claim 1 wherein the spark timing is controlled in response to at least engine speed.

3. An electronic ignition as set forth in claim 2 wherein the means for adjusting spark timing is effective to determine a change in throttle valve position and also a change in engine speed and to accomplish the adjustment in spark timing only in the event the engine speed changes without a change in position of the throttle valve.

4. An electronic ignition as set forth in claim 3 wherein the means for adjusting spark timing changes the spark timing relative to the spark timing called for at the sensed speed.

5. An electronic ignition as set forth in claim 4 wherein the means for adjusting the spark timing advances the spark timing from the called for spark timing in response to an engine speed decrease.

6. An electronic ignition as set forth in claim 4 wherein the means for changing the spark timing retards the spark timing from the called for spark timing in response to an engine speed increase.

7. An electronic ignition as set forth in claim 6 wherein the means for adjusting the spark timing also advances the spark timing from the called for spark timing in response to an engine speed decrease.

* * * * *